Patented Mar. 10, 1931

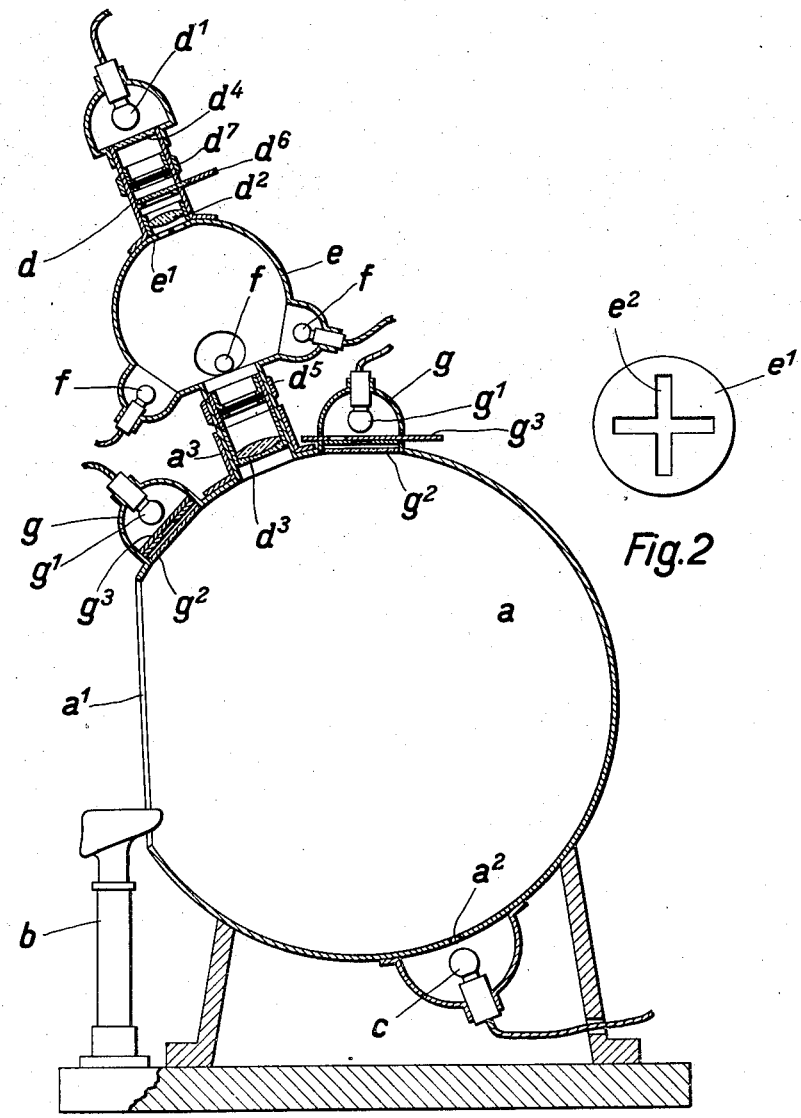

1,795,752

UNITED STATES PATENT OFFICE

WALTHER BAUERSFELD AND HANS HARTINGER, OF JENA, GERMANY, ASSIGNORS TO THE FIRM CARL ZEISS, OF JENA, GERMANY

APPARATUS FOR TESTING LIGHT SENSE

Application filed April 28, 1930, Serial No. 448,087, and in Germany May 16, 1929.

The present invention provides an apparatus for testing the light sense, for instance the so-called discrimination threshold or the sensibility of the eyes with respect to luminous and chromatic contrasts or the like, which, while allowing to obtain a completely uniform illumination of the surroundings of the testing field, avoids any disturbing limitation of the said surroundings and, at the same time, permits of the eyes correctly adapting themselves to a certain intensity of illumination during the examination.

The apparatus corresponding to the invention consists of a hollow globe having a diffusely reflecting interior and being associated with a number of lamps of variable intensity which serve for illuminating its interior. The said globe has an opening to receive the face of the person to be examined and provision is made that only diffusely radiated rays of light are permitted to enter the subject's eyes. Moreover, the globe is equipped with an appliance for producing a light spot of changeable intensity on its interior wall, in the direction of the subject's field of vision.

This light spot might be produced and given a variable intensity for instance by making the globe wall translucent on the respective place and by disposing behind this place a source of light. However, the consequence would be want of uniformity of the interior globe surface, and disturbances in the examination might be the result. The purpose is answered in a better way by connecting with the globe a projection apparatus for projecting the light spot by incident light through the globe on the interior surface of same. In order to allow of producing also a spot which is darker than its surroundings, a screen having apertures is disposed between the objective and the source of light of the projection apparatus. That side of the screen which faces the objective is made for diffuse reflection. Additional sources of light are arranged between the said screen and the objective in such a way that they can be used for illuminating the screen without their light striking the objective direct.

The apertures in the screen serve, on one hand, for passing the light of the projection lamp through the screen so as to allow the production of a luminous examination spot. On the other hand, however, when the projection lamp is switched out and the said additional sources of light are switched on, the screen causes a lighting of the interior globe wall except on those places where the apertures are imaged, so that these images appear dark on a light field.

In order to ensure for the (dark) examination point as uniform a surrounding as possible, a spherical form is suitably given also to the said screen.

With a view to afford the patient an idea as to the place on which the examination point appears, this place is suitably marked for instance by means of a fine hole provided in the globe wall and illuminated from outside.

The accompanying drawing shows in Figure 1 a constructional example of the invention in a section. Figure 2 is the view of a single part of the apparatus.

The apparatus represented in the drawing has a globe $a$ whose interior is given a dull white colour, and which is provided with an opening $a^1$. This opening has in front a chin rest $b$ for the subject, and opposite, in the globe wall, a fine hole $a^2$ is provided which is illuminated by means of an incandescent bulb $c$ behind. Diametrically opposite the hole $a^2$ is a projection apparatus $d$ which principally consists of a source of light $d^1$, a condenser $d^2$, and a projection objective $d^3$. Between the condenser $d^2$ and the objective $d^3$ is disposed a spherical screen $e$ of which the part lying in the path of the rays of the projection apparatus is a circular plate $e^1$ (Figures 1 and 2). the plate $e^1$, which is made of a substance impervious to light, has a cross-shaped section $e^2$. Opposite the plate $e^1$ incandescent bulbs $f$ are placed on the screen $e$. The screen $e$, like the globe $a$, has its interior surface covered with a dull white colour. The projection apparatus comprises further a ground glass disc $d^4$ and a completely closing iris diaphragm $d^5$. Moreover, the sleeve between the condenser $d^2$ and the ground glass disc $d^4$ is given an aperture through which a colour filter $d^6$ can be inserted in the path of the rays. An iris diaphragm, $d^7$, is provided also between the ground glass disc $d^4$ and the colour filter $d^6$. The whole projection apparatus is inserted in a sleeve $a^3$ disposed on the globe $a$ in such a way that the projection apparatus allows of being easily taken off and, if so required, interchanged with another device, for instance a spectral apparatus for producing homogeneous coloured light. Round the sleeve $a^3$, in dome-shaped recesses $g$, are disposed incandescent bulbs $g^1$ which provide the general illumination for the interior of the globe $a$. The domeshaped recesses $g$ are closed towards the globe $a$ by means of ground glass discs $g^2$. They are provided also with slidable shutters $g^3$ whose apertures allow of being adjusted.

In order to find by means of the instrument described hereinbefore for instance the so-called threshold value of the eyes of the subject, namely the smallest sensation of light which the said person still has, first all lamps are switched out for such a time as the subject requires to adapt himself to the darkness. Thereupon one of the lamps $g^1$ is switched on, while the appertaining shutter $g^3$ must be closed, and then this shutter is opened gradually so far until the subject has a sensation of light. By means of the intensity of the lamp $g^1$, certain constants of the apparatus, and the amount of light passing through the shutter $g^3$, the threshold value can be found out objectively.

The sensibility as regards contrasts can be examined e. g. in the following way. By switching on and regulating the lamps $g^1$ accordingly as well as by correctly adjusting the shutters $g^3$ the desired degree of brightness is imparted to the interior of the globe $a$ which, now, affords the subject the sensation of a uniformly bright and unlimited space, thus preventing any diversion of his eyes. The subject having become accustomed to the brightness, the lamp $d^1$ is switched on and the filter $d^6$ removed, whereby the iris diaphragm $d^5$ must be closed and the diaphragm $d^7$ open. Now, in order to allow the cross-shaped section $e^2$ to be projected on the globe wall, namely on the place of the hole $a^2$, the iris diaphragm $d^5$ is opened so far until the subject can perceive the projected cross which, in this case, appears light on a darker field.

However, should the sensibility be determined with regard to a dark examination field, the interior of the globe is illuminated first by means of the lamps $g^1$, whereupon, with open iris diaphragm $d^5$ but closed diaphragm $d^7$, the lamps $f$ are switched on. In this case the image of the cross $e^2$ appears dark in a light field on the interior wall of the globe. Thereupon the lamp $d^1$ is switched on and the diaphragm $d^7$ opened and, as a result, the dark cross is gradually made brighter again. Now the intensity of the lamps $d^1$ and $f$ is adjusted in such a manner that the image of the cross just disappears, and the iris diaphragm $d^7$ is gradually closed so far until the subject can see the image of the cross dark in a light field.

In a similar manner, by applying corresponding filters, also chromatic contrasts can be produced so as to allow the eyes of a person to be examined also with respect to colour sensation.

We claim:

1. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a device connected with the hollow globe and adapted to produce a light spot in the subject's field of vision, and means for altering the intensity of this light spot.

2. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a projection apparatus disposed on the hollow globe and adapted to project a light spot in the subject's field of vision, on the interior wall of the globe, and means for altering the intensity of this light spot.

3. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a projection apparatus disposed on the hollow globe, the projection apparatus comprising a source of light and an objective and comprising further a screen arranged between the source of light and the objective, the said screen having apertures and reflecting diffusely on the side facing the objective, additional sources of light allowing of illuminating the diffusely reflecting side of the screen, the projection apparatus being adapted to project the screen on the interior wall of the globe, and means for altering the brightness of the projected image.

4. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a projection apparatus disposed on the hollow globe, the projection apparatus comprising a source of light and an objective and comprising further a spherical screen diffusely reflecting in its interior, the spherical screen being provided between the source of light and the objective and turning its interior towards the objective and having apertures, additional sources of light permitting of illuminating the interior wall of the spherical screen, the projection apparatus being adapted to project the surroundings of the apertures of the spherical screen on the interior wall of the globe, and means for altering the brightness of the projected image.

5. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a device connected with the hollow globe and adapted to produce a light spot in the subject's field of vision, means for altering the intensity of this light spot, and a hole visible on that place in the globe where the light spot is produced.

6. An apparatus for testing the light sense, comprising a hollow globe being in its interior adapted to diffusely reflect light and having an opening to receive the subject's face, a number of lamps for illuminating the interior of the said globe without being visible direct to the subject, means for adjusting the luminous intensity of the said lamps, a projection apparatus detachably disposed on the hollow globe and adapted to project a light spot in the subject's field of vision, on the interior wall of the globe, and means for altering the intensity of this light spot.

WALTHER BAUERSFELD.
HANS HARTINGER.